(12) United States Patent
Okubo

(10) Patent No.: US 11,735,209 B2
(45) Date of Patent: Aug. 22, 2023

(54) MAGNETIC DISK DEVICE AND METHOD OF GENERATING WRITE DATA

(71) Applicants: Kabushiki Kaisha Toshiba, Tokyo (JP); Toshiba Electronic Devices & Storage Corporation, Tokyo (JP)

(72) Inventor: Tomokazu Okubo, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/653,943

(22) Filed: Mar. 8, 2022

(65) Prior Publication Data

US 2023/0081206 A1    Mar. 16, 2023

(30) Foreign Application Priority Data

Sep. 16, 2021   (JP) .................. 2021-151292

(51) Int. Cl.
  *G11B 20/12*   (2006.01)
  *G11B 5/012*   (2006.01)
(52) U.S. Cl.
  CPC .................. *G11B 5/012* (2013.01)
(58) Field of Classification Search
  CPC ....... G11B 5/09; G11B 5/39; G11B 20/10222; G11B 2005/0018; G11B 2005/0021; G11B 5/012; G11B 5/00; G11B 20/10037; G11B 20/1217; G11B 20/10009; G11B 5/6047; G11B 11/10508; G11B 11/10588; G11B 20/12
  USPC .................. 360/53, 48; 369/59.11, 59.13
  See application file for complete search history.

(56) References Cited

U.S. PATENT DOCUMENTS

| | | | |
|---|---|---|---|
| 7,301,483 B2 | 11/2007 | Shim et al. | |
| 10,084,570 B2 | 9/2018 | Regev et al. | |
| 10,446,184 B1 | 10/2019 | Liu et al. | |
| 10,734,016 B2 | 8/2020 | Oberg et al. | |
| 10,885,932 B1 * | 1/2021 | Liu .......................... | G11B 5/09 |

* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a magnetic disk device, including a disk, a head to write data to the disk and read data from the disk, a preamplifier to generate a recording current corresponding to data that the head writes to the disk, and a controller to convert a first data pattern in first write data, in accordance with a pattern length of a second data pattern previous to the first data pattern, to a different data pattern including a pseudo polarity inversion that does not cause a polarity inversion when converting the first data pattern to the recording current.

20 Claims, 9 Drawing Sheets

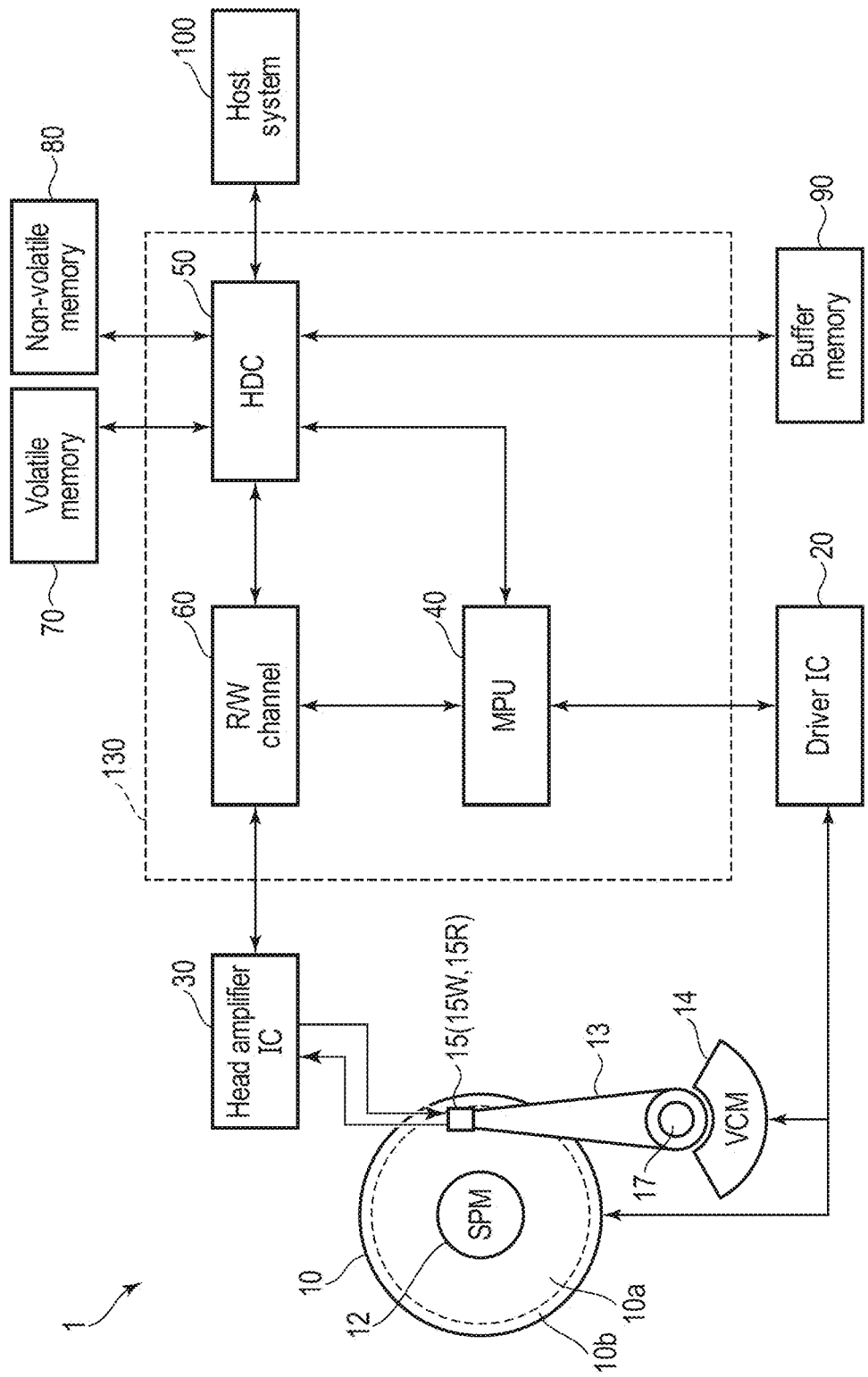
F I G. 1

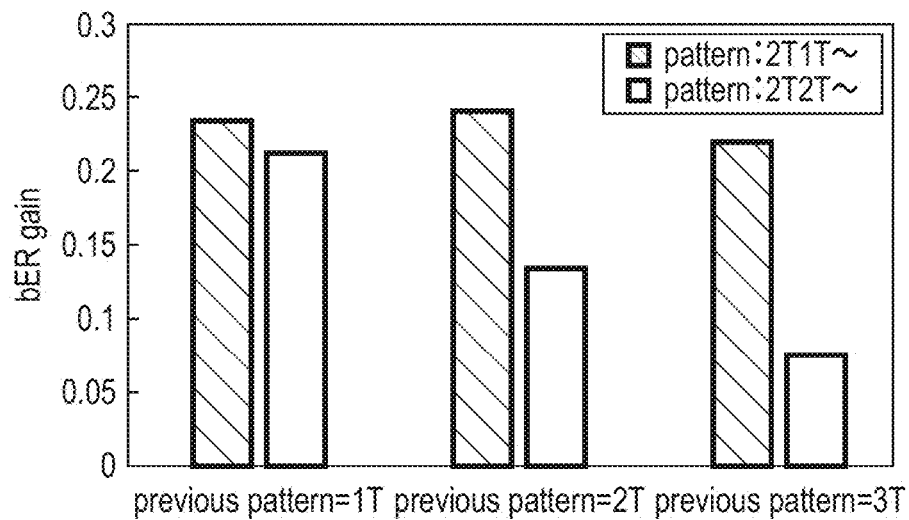
F I G. 5
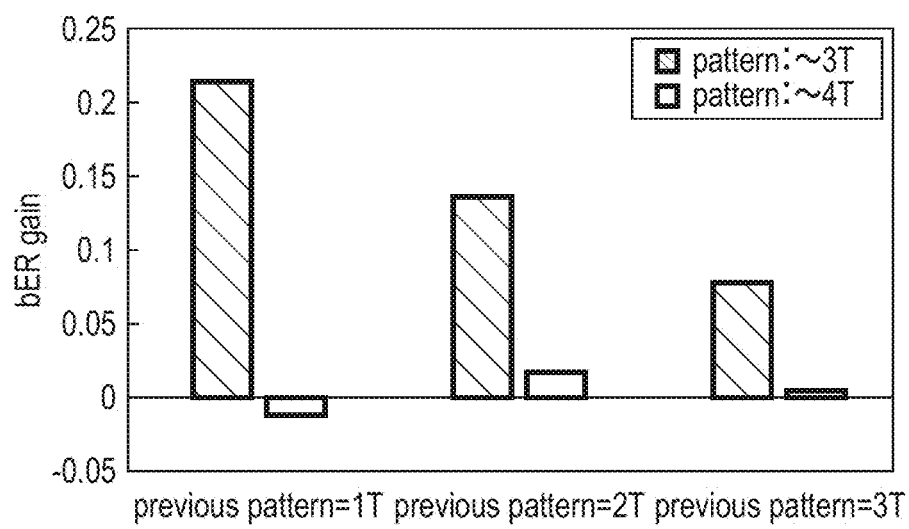
F I G. 6

| Conversion target pattern | PBW pattern set1 (after 1T pulse) | | PBW pattern set2 (after nT pulse, n=2,3) | |
|---|---|---|---|---|
| | PBW pattern | NRZ | PBW pattern | NRZ |
| 1T | 1T | 1 | 1T | 1 |
| 2T | 2T | 11 | 2T | 11 |
| 3T | 3T | 111 | 3T | 111 |
| 4T | 2T1T1T | 1101 | 1T1T2T | 1011 |
| 5T | 2T1T2T | 11011 | 1T1T3T | 10111 |
| 6T | 2T1T3T | 110111 | 1T1T2T1T1T | 101101 |
| 7T | 2T1T2T1T1T | 1101101 | 1T1T2T1T2T | 1011011 |
| 8T | 2T1T2T1T2T | 11011011 | 1T1T2T1T3T | 10110111 |
| 9T | 2T1T2T1T3T | 110110111 | 1T1T2T1T2T1T1T | 101101101 |
| 10T | 2T1T2T1T2T1T1T | 1101101101 | 1T1T2T1T2T1T2T | 1011011011 |
| 11T | 2T1T2T1T2T1T2T | 11011011011 | 1T1T2T1T2T1T3T | 10110110111 |
| 12T | 2T1T2T1T2T1T3T | 110110110111 | 1T1T2T1T2T1T2T1T1T | 101101101101 |
| 13T | 2T1T2T1T2T1T2T1T1T | 1101101101101 | 1T1T2T1T2T1T2T1T2T | 1011011011011 |
| 14T | 2T1T2T1T2T1T2T1T2T | 11011011011011 | 1T1T2T1T2T1T2T1T3T | 10110110110111 |
| 15T | 2T1T2T1T2T1T2T1T3T | 110110110110111 | 1T1T2T1T2T1T2T1T2T1T1T | 101101101101101 |
| 16T | 2T1T2T1T2T1T2T1T2T1T1T | 1101101101101101 | 1T1T2T1T2T1T2T1T2T1T2T | 1011011011011011 |

TB1

F I G. 7

| Conversion target pattern | PBW pattern set1 (after 1T pulse) | | PBW pattern set3 (after nT pulse, n=2,3) | |
|---|---|---|---|---|
| | PBW pattern | NRZ | PBW pattern | NRZ |
| 1T | 1T | 1 | 1T | 1 |
| 2T | 2T | 11 | 2T | 11 |
| 3T | 3T | 111 | 3T | 111 |
| 4T | 2T1T1T | 1101 | 1T1T2T | 1011 |
| 5T | 2T1T2T | 11011 | 2T1T2T | 11011 |
| 6T | 2T1T3T | 110111 | 2T1T3T | 110111 |
| 7T | 2T1T2T1T1T | 1101101 | 1T1T2T1T2T | 1011011 |
| 8T | 2T1T2T1T2T | 11011011 | 2T1T2T1T2T | 11011011 |
| 9T | 2T1T2T1T3T | 110110111 | 2T1T2T1T3T | 110110111 |
| 10T | 2T1T2T1T2T1T1T | 1101101101 | 1T1T2T1T2T1T2T | 1011011011 |
| 11T | 2T1T2T1T2T1T2T | 11011011011 | 2T1T2T1T2T1T2T | 11011011011 |
| 12T | 2T1T2T1T2T1T3T | 110110110111 | 2T1T2T1T2T1T3T | 110110110111 |
| 13T | 2T1T2T1T2T1T2T1T1T | 1101101101101 | 1T1T2T1T2T1T2T1T2T | 1011011011011 |
| 14T | 2T1T2T1T2T1T2T1T2T | 11011011011011 | 2T1T2T1T2T1T2T1T2T | 11011011011011 |
| 15T | 2T1T2T1T2T1T2T1T3T | 110110110110111 | 2T1T2T1T2T1T2T1T3T | 110110110110111 |
| 16T | 2T1T2T1T2T1T2T1T2T1T1T | 1101101101101101 | 1T1T2T1T2T1T2T1T2T1T2T | 1011011011011011 |

FIG. 8

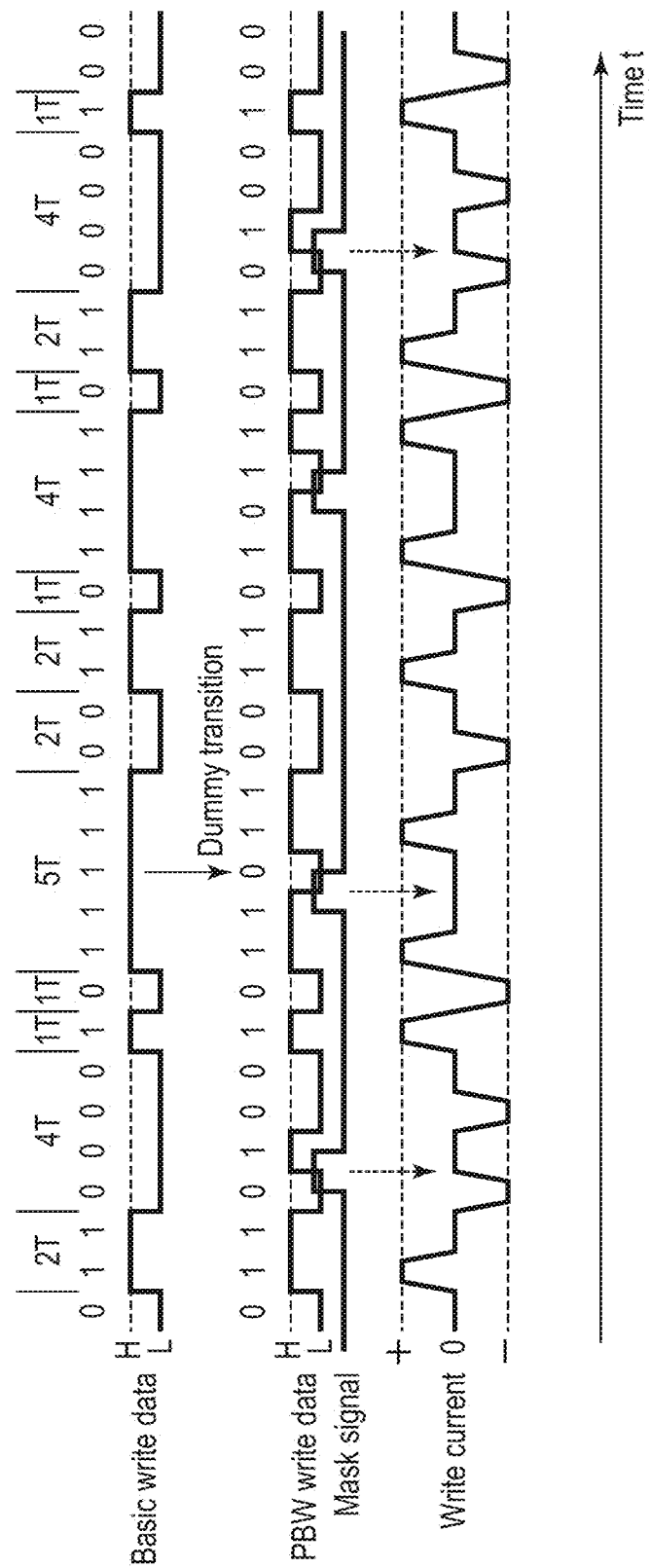
F I G. 9A

MAGNETIC DISK DEVICE AND METHOD OF GENERATING WRITE DATA

CROSS-REFERENCE TO RELATED APPLICATIONS

This application is based upon and claims the benefit of priority from Japanese Patent Application No. 2021-151292, filed Sep. 16, 2021, the entire contents of which are incorporated herein by reference.

FIELD

Embodiments described herein relate generally to a magnetic disk device and a method of generating write data.

BACKGROUND

A magnetic disk device that can write in a pulse based writing (PBW) method, which is a writing method using a waveform of a recording current that includes a waveform that rises and falls in a pulse state (overshoots) at regular intervals, or does not include a DC component corresponding to a fixed current value that is smaller than an absolute value of the waveform that rises or falls in the pulse state but larger than zero has been developed. The magnetic disk device converts a data pattern having a specific pattern length out of a particular write data (may be hereinafter referred to as a conversion target pattern) to a specific data pattern (may be hereinafter referred to as a PBW pattern) according to one-to-one correspondence. The PBW pattern includes a pseudo polarity inversion that does not cause a polarity inversion when the PBW pattern is converted to a recording current (may be hereinafter referred to as a dummy inversion). The magnetic disk device of the PBW method generates the recording current from a PBW pattern without causing polarity inversion at a position of the dummy inversion based on the mask signal indicating the position of the dummy inversion. In the magnetic disk device, recording quality of a bit error rate (BER) and the like in the case where data is written to a disk in the PBW method in accordance with a data pattern before and after the conversion target pattern out of the particular write data can be affected.

BRIEF DESCRIPTION OF THE DRAWINGS

FIG. 1 is a block diagram illustrating a configuration of a magnetic disk device according to an embodiment.

FIG. 5 is a diagram illustrating an example of an effect of a combination of a headmost adjacent pattern of the conversion target pattern and the previous data pattern on the recording quality caused.

FIG. 6 is a diagram illustrating an example of an effect of a combination of an end pattern of the conversion target pattern and the previous data pattern on the recording quality.

FIG. 7 is a schematic diagram illustrating an example of a pattern conversion table according to the embodiment.

FIG. 8 is a schematic diagram illustrating an example of the pattern conversion table according to the embodiment.

FIG. 9A is a schematic diagram illustrating an example of a method of converting write data according to the embodiment.

DETAILED DESCRIPTION

Figure 2:
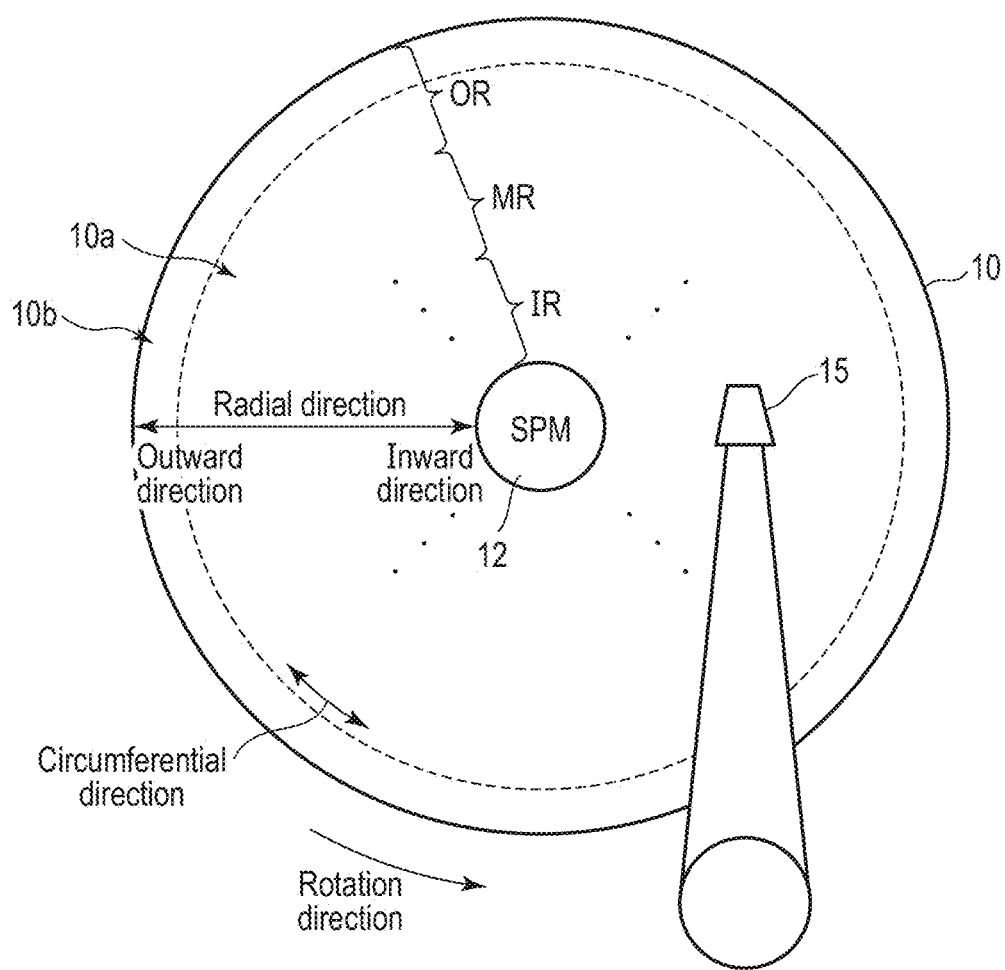
FIG. 2 is a schematic diagram illustrating an example of a disk according to the embodiment.

In general, according to one embodiment, a magnetic disk device, comprising: a disk; a head to write data to the disk and read data from the disk; a preamplifier to generate a recording current corresponding to data that the head writes to the disk; and a controller to convert a first data pattern in first write data, in accordance with a pattern length of a second data pattern previous to the first data pattern, to a different data pattern including a pseudo polarity inversion that does not cause a polarity inversion when converting the first data pattern to the recording current.

An embodiment will be hereinafter described with reference to the drawings. It should be noted that the drawings are examples and are not to limit the scope of the invention.

EMBODIMENT

FIG. 1 is a block diagram illustrating a configuration of a magnetic disk device 1 according to an embodiment.

The magnetic disk device 1 includes a head disk assembly (HDA), a driver IC 20, a head amplifier integrated circuit (hereinafter referred to as a head amplifier IC or a preamplifier) 30, a volatile memory 70, a non-volatile memory 80, a buffer memory (buffer) 90, and a system controller 130 that is a one-chip integrated circuit, and each description will follow. The magnetic disk device 1 is connected to a host system (hereinafter simply referred to as a host) 100. The HDA includes a magnetic disk (hereinafter referred to as a disk) 10, a spindle motor (hereinafter referred to as a SPM) 12, an arm 13 on which a head 15 is mounted, and a voice coil motor (hereinafter referred to as a VCM) 14. The disk 10 is attached to the SPM 12 and rotated by driving of the SPM 12. The arm 13 and the VCM 14 form an actuator. The actuator controls a movement of the head 15 mounted on the arm 13 to a particular position of the disk 10 by driving of the VCM 14. Two or more of the disks 10 and two or more of the heads 15 may be provided.

To a writable region of the disk 10, a user data region 10a available to a user and a system area 10b to which information necessary for system management is written are assigned. A direction from the inner periphery to the outer periphery of the disk 10, or a direction from the outer periphery to the inner periphery of the disk 10 is hereinafter referred to as a radial direction. In the radial direction, the direction from the inner periphery to the outer periphery is referred to as an outward direction (or outer side), and the direction from the outer periphery to the inner periphery is referred to as an inward direction (or inner side). A circumferential direction corresponds to a direction along the circumference of the disk 10. The radial direction and the circumferential direction are orthogonal to each other. Further, a particular position in the radial direction of the disk 10 may be referred to as a radial position, and a particular position in the circumferential direction of the disk 10 may be referred to as a circumferential position. The radial position and the circumferential position may be collectively and simply referred to as a position. The user data region 10a of the disk 10 may be divided into a plurality of regions. For example, in the radial direction, the user data region 10a may be divided into regions including a particular number of tracks (may be hereinafter referred to as zones). The zone may be divided into tracks in the radial direction.

The "track" is used in various senses such as one recording region out of a plurality of the recording regions obtained by dividing the disk 10 in the radial direction, a recording region of one round on a particular radial position on the disk 10, a particular recording region in a particular radial position on the disk 10, a recording region extending in the circumferential direction on the disk 10, a recording region corresponding to a route of the head 15 positioned above a particular radial position on the disk 10, a route of the head 15 positioned above a particular radial position on the disk 10, data written to one recording region out of the plurality of the recording regions obtained by dividing the disk 10 in the radial direction, data written to a recording region of one round on a particular radial position on the disk 10, data written to a particular recording region in a particular radial position on the disk 10, data written to a recording region extending in the circumferential direction on the disk 10, data written to a recording region corresponding to a route of the head 15 positioned above a particular radial position on the disk 10, data written along a route of the head 15 positioned above a particular radial position on the disk 10, data extending in the circumferential direction on the disk 10, data written to a particular track on the disk 10, data for one round written to a particular track on the disk 10, and a part of data written to a particular track on the disk 10. A "sector" is used in various senses such as one recording region out of a plurality of recording regions obtained by dividing a particular track on the disk 10 in the circumferential direction, one recording region out of the plurality of the recording regions obtained by dividing the recording region extending in the circumferential direction in a particular radial position on the disk 10, a particular recording region in a particular track on the disk 10, a particular circumferential position in a particular track on the disk 10, a particular circumferential position (a particular position) in a particular radial position on the disk 10, data written to one recording region out of the plurality of the recording regions obtained by dividing a particular track on the disk 10 in the circumferential direction, data written to one recording region out of the plurality of the recording regions obtained by dividing the recording region extending in the circumferential direction in a particular radial position on the disk 10, data written to a particular recording region in a particular track on the disk 10, data written to a particular circumferential position in a particular track on the disk 10, data written to a particular circumferential position (a particular position) in a particular radial position on the disk 10, and data written to a particular sector. A "width, in the radial direction, of the track" may be referred to as a "track width". A "route through the center position of the track width on a particular track" may be referred to as a "track center".

The head 15 includes a slider as the main body, and a write head 15W and a read head 15R installed on the slider. The write head 15W writes data to the disk 10 according to a write current (or a recording current) output from the head amplifier IC to be described below. The read head 15R reads data recorded on the disk 10. The "write head 15W" may be simply referred to as the "head 15", and the "read head 15R" may be simply referred to as the "head 15", and "the write head 15W and the read head 15R" may be collectively and simply referred to as the "head 15". The "center part of the head 15" may be referred to as the "head 15", and the "center part of the write head 15W" may be referred to as the "write head 15W", and the "center part of the read head 15R" may be referred to as the "read head 15R". The "center part of the write head 15W" may be simply referred to as the "head 15", and the "center part of the read head 15R" may be simply referred to as the "head 15". "Positioning the center part of the head 15 to the track center of a particular track" may be expressed, for example, as "positioning the head 15 to a particular track", "placing the head 15 above the particular track", or "locating the head 15 above the particular track".

FIG. 2 is a schematic diagram illustrating an example of the disk 10 according to the present embodiment. As illustrated in FIG. 2, a direction in which the disk 10 is rotated along the circumferential direction is referred to as a rotation direction. In the example illustrated in FIG. 2, the rotation direction is illustrated as a counterclockwise direction, however, the rotation direction may be reversed (clockwise). In FIG. 2, the disk 10 is divided into an inner peripheral region IR positioned on the inner side, an outer peripheral region OR positioned on the outer side, and a middle peripheral region MR positioned between the inner peripheral region IR and the outer peripheral region OR.

In the example illustrated in FIG. 2, the disk 10 includes the user data region 10a and the system area 10b. In FIG. 2, the user data region 10a and the system area 10b are adjacent in the radial direction. "Adjacent" in this description means that data items, objects, regions, spaces, and the like are arranged in contact with each other, but may also mean that they are arranged at a particular interval. In FIG. 2, the system area 10b is adjacent to the outer side of the user data region 10a. The system area 10b may be adjacent to the inner side of the user data region 10a. Alternatively, the system area 10b may be positioned within the user data region 10a in the radial direction.

In the example illustrated in FIG. 2, the user data region 10a is positioned to range from the inner peripheral region IR to the outer peripheral region OR. The system area 10b is positioned in the outer peripheral region OR. The system area 10b may be positioned in the inner peripheral region IR or the middle peripheral region MR. The system area 10b may be dispersedly positioned in the outer peripheral region OR, the middle peripheral region MR, or the inner peripheral region IR.

As illustrated in FIG. 2, the head 15 is rotated around the rotation shaft by the driving of the VCM 14 to move with respect to the disk 10 from the inner side to the outer side and to be positioned in a particular position, or from the outer side to the inner side and to be positioned in a particular position.

The driver IC 20 controls driving of the SPM 12 and the VCM 14 in accordance with control of the system controller 130 (specifically a micro processing unit (MPU) 40 to be described below).

The head amplifier IC (preamplifier) 30 includes a read amplifier and a write driver. The read amplifier amplifies a read signal read from the disk 10 and outputs the amplified signal to the system controller 130 (specifically a read/write (R/W) channel 60 to be described below). The write driver outputs, to the head 15, a write current (or a recording current) according to write data output from the R/W channel 60. The head amplifier IC 30 is electrically connected to the head 15 and the R/W channel 60 via wiring and the like.

The volatile memory 70 is a semiconductor memory in which stored data is lost when power supply stops. The volatile memory 70 stores data and the like that are necessary for processing in each part of the magnetic disk device 1. The volatile memory 70 is, for example, a dynamic random access memory (DRAM) or a synchronous dynamic random access memory (SDRAM).

The non-volatile memory 80 is a semiconductor memory in which stored data is recorded even when power supply stops. The non-volatile memory 80 is, for example, a NOR type or NAND type flash read only memory (FROM).

The buffer memory 90 is a semiconductor memory that temporarily records data and the like that are transmitted and received between the magnetic disk device 1 and a host 100. The buffer memory 90 may be integrally formed with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is achieved, for example, by using a large-scale integrated circuit (LSI) referred to as a system-on-a-chip (SoC) having a plurality of elements integrated on a single chip. The system controller 130 includes the microprocessor (MPU) 40, a hard disk controller (HDC) 50, the read/write (R/W) channel 60, and the like. The MPU 40, the HDC 50, and the R/W channel 60 are electrically connected to each other. The system controller 130 is electrically connected, for example, to the driver IC 20, the head amplifier IC 30, the volatile memory 70, the non-volatile memory 80, the buffer memory 90, the host 100, and the like.

The MPU 40 is a main controller that controls each part of the magnetic disk device 1. The MPU 40 controls the VCM 14 via the driver IC 20 to perform servo control to position the head 15. The MPU 40 controls the SPM 12 via the driver IC 20 to rotate the disk 10. The MPU 40 controls a write operation for writing data to the disk 10, and also selects a storage destination for data transferred from the host 100 and written to the disk 10 (may be hereinafter referred to as write data). The MPU 40 controls a read operation for reading data from the disk 10, and also controls processing on the data transferred from the disk 10 to the host 100 (may be hereinafter referred to as read data). The "write data" may be hereinafter simply referred to as "data". The "read data" may be simply referred to as "data". The "write data and read data" may be collectively and simply referred to as "data". The MPU 40 manages a region in which data is recorded. The MPU 40 is connected to each part of the magnetic disk device 1. The MPU 40 is electrically connected, for example, to the driver IC 20, the HDC 50, the R/W channel 60, and the like.

The MPU 40 controls read processing for reading data from the disk 10 and write processing for writing data to the disk 10, in accordance with a command and the like from the host 100. The MPU 40 controls the VCM 14 via the driver IC 20 to position the head 15 to a particular position of the disk 10, and performs the read processing or the write processing. A term "access" may be hereinafter used in senses including recording data in a particular region or writing (or the write processing), reading out or reading data from the particular region (or the read processing), or moving the head 15 and the like to the particular region.

The HDC 50 controls data transfer. For example, the HDC 50 controls data transfer between the host 100 and the R/W channel 60 to be described below in response to an instruction from the MPU 40. The HDC 50 is electrically connected, for example, to the MPU 40, the R/W channel 60, the volatile memory 70, the non-volatile memory 80, the buffer memory 90, and the like.

The R/W channel 60 performs, in response to an instruction from the MPU 40, signal processing on the read data transferred from the disk 10 to the host 100 and the write data transferred from the host 100. The R/W channel 60 includes a circuit or a function for measuring signal quality of the read data. The R/W channel 60 includes a circuit or a function for performing signal processing on the write data transferred from the host 100 and the like. The R/W channel 60 is electrically connected, for example, to the head amplifier IC 30, MPU 40, the HDC 50, and the like.

In the head 15, the head amplifier IC 30, and the system controller 130, a system that writes, to the disk 10, the write data transferred from the host 100 may be hereinafter referred to as a write system.

Figure 3:
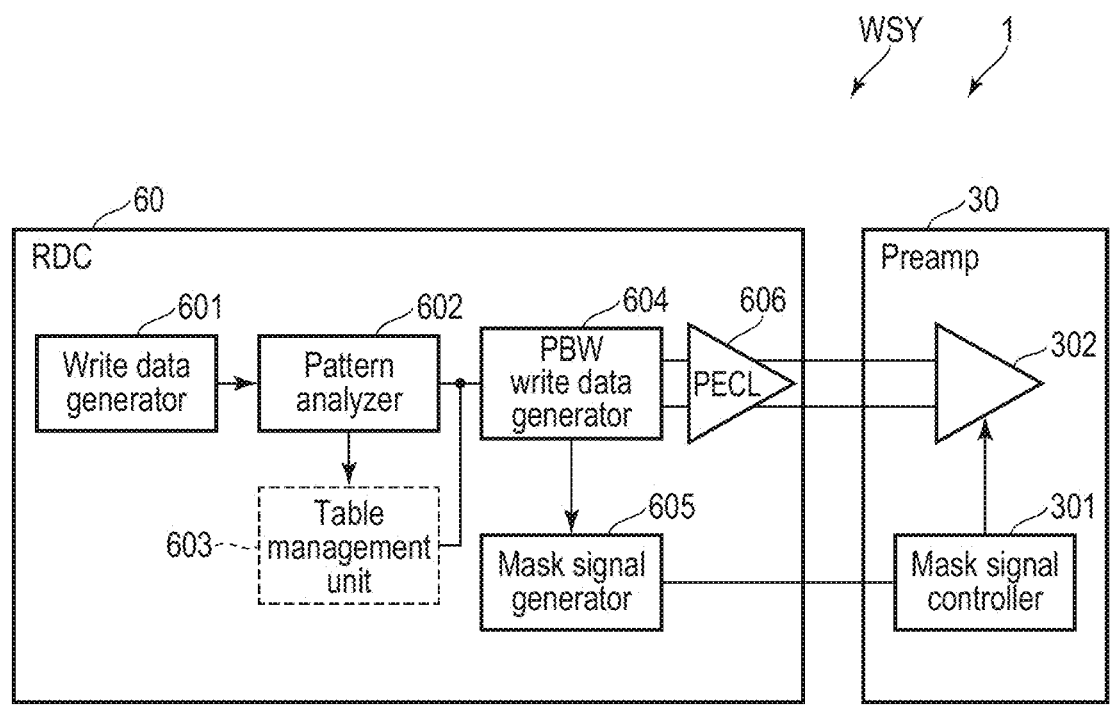
FIG. 3 is a schematic diagram illustrating a configuration example of a write system of the magnetic disk device according to the embodiment.

FIG. 3 is a schematic diagram illustrating a configuration example of the write system WSY of the magnetic disk device 1 according to the present embodiment. FIG. 3 only illustrates a configuration necessary for the description.

The write system WSY includes the head 15, the head amplifier IC 30, and the system controller 130. The write system WSY generates write data.

The R/W channel 60 includes, as the write system WSY, a write data generator 601, a pattern analyzer 602, a table management unit 603, a pulse based writing (PBW) write data generator 604, a mask signal generator 605, a positive emitter coupled logic (PECL) 606, and the like. The R/W channel 60 may perform, on firmware, processing performed by the write data generator 601, the pattern analyzer 602, the table management unit 603, the PBW write data generator 604, the mask signal generator 605, the PECL 606, and the like, or include, as a circuit, the write data generator 601, the pattern analyzer 602, the table management unit 603, the PBW write data generator 604, the mask signal generator 605, the PECL 606, and the like.

The head amplifier IC 30 includes, as the write system WSY, a mask signal controller 301, a write driver 302, and the like. The head amplifier IC 30 may perform, on firmware, processing performed by the mask signal controller 301, the write driver 302, and the like, or include, as a circuit, the mask signal controller 301, the write driver 302, and the like.

The write data generator 601 performs signal processing on data transferred from the host 100 via the HDC 50 to generate write data (may be hereinafter referred to as basic write data). The write data generator 601 is connected to the pattern analyzer 602. The write data generator 601 outputs the generated basic write data to the pattern analyzer 602.

The pattern analyzer 602 analyzes a data pattern of the write data (may be hereinafter simply referred to as a pattern). For example, the pattern analyzer 602 analyzes a data pattern of a bit sequence of write data, a pattern length (nT) of a data pattern, and the like. Here, n is a positive integer. 1T corresponds to a unit length of a pattern length. 1T corresponds to a data pattern of 1T bits in a non-return to zero (NRZ) method. nT is a pattern length n times longer than 1T. The pattern analyzer 602 is connected to the write data generator 601, the table management unit 603, and the PBW write data generator 604. The pattern analyzer 602 outputs an analyzation result (may be hereinafter referred to as an analysis result) to the table management unit 603 and the PBW write data generator 604. The "data pattern having a pattern length nT" may be hereinafter referred to as an "nT data pattern". "A sequence of data patterns having a pattern length nT, a data pattern of a pattern length mT, and so on"

may be referred to as an "[nT, mT, . . . ] data pattern" or an "nT+mT+ . . . data pattern". Here, m is a positive integer.

The table management unit 603 manages a pattern conversion table. For example, the table management unit 603 also functions as a memory that holds the pattern conversion table. The table management unit 603 includes at least one pattern conversion table. For example, the table management unit 603 includes a plurality of the pattern conversion tables. The table management unit 603 selects a pattern conversion table from the plurality of the pattern conversion tables and switches between them based on the analysis result input from the pattern analyzer 602, and properties of the disk 10 and the head 15 and the like. The table management unit 603 is connected to the pattern analyzer 602 and the PBW write data generator 604. The table management unit 603 outputs the selected pattern conversion table to the PBW write data generator 604.

The PBW write data generator 604 generates write data corresponding to a recording current of a pulse based writing (PBW) method (may be hereinafter referred to as PBW write data). The PBW method is a recording method for writing data using a waveform of the recording current that rises or falls in a pulse state at positions where polarity is inversed (may be hereinafter referred to as overshooting) and does not include a DC section in which the recording current except for the overshooting recording current has a particular current value smaller than the overshooting recording current, for example, a fixed current value larger than zero. Therefore, in the waveform of the recording current in the PBW method, the recording current rises or falls by a relatively large recording current in a pulse state at positions where polarity of the recording current is inversed such that a magnetic field becomes stronger (overshooting), and the recording current except for the overshooting recording current has a fixed current value that is, for example, zero. The PBW write data generator 604 is connected to the pattern analyzer 602, the table management unit 603, the mask signal generator 605, the PECL 606, and the like. The PBW write data generator 604 outputs PBW write data to each of the mask signal generator 605 and the PECL 606. The PBW write data generator 604 may output PBW write data in the middle of generation to the pattern analyzer 602 when generating the PBW write data.

The PBW write data generator 604 converts (changes, modulates, or adjusts) basic write data to PBW write data by converting (changing, modulating, or adjusting), based on the analysis result and the selected pattern conversion table, the data pattern having a particular pattern length out of the basic write data (may be hereinafter referred to as a conversion target pattern) to a data pattern including a pseudo polarity inversion (may be hereinafter referred to as a dummy inversion) on which signal processing is performed such that the polarity inversion is not caused when the conversion target pattern is converted to a recording current (the data pattern may be hereinafter referred to as a PBW pattern).

The PBW write data generator 604 converts the conversion target pattern out of the basic write data to the PBW pattern, based on the analysis result and the pattern conversion table, in accordance with the pattern length of the data pattern that has been PBW-converted and is previous to (transferred just before, or contiguous with and earlier in time than) the particular conversion target pattern. In other words, the PBW write data generator 604 changes, based on the analysis result and the pattern conversion table, a position of the dummy inversion of the PBW pattern obtained after conversion of the particular conversion target pattern out of the basic write data in accordance with the pattern length of the PBW data pattern previous to the particular conversion target pattern. In the process of converting the basic write data to the PBW write data, the PBW write data generator 604 converts, based on the analysis result and the pattern conversion table, the particular conversion target pattern out of the basic write data to the PBW pattern in accordance with the pattern length of the data pattern previous, in the PBW pattern, to the particular conversion target pattern. In other words, in the process of converting the basic write data to the PBW write data, the PBW write data generator 604 changes, based on the analysis result and the pattern conversion table, the position of the dummy inversion of the PBW pattern obtained after conversion of the particular conversion target pattern out of the basic write data in accordance with the pattern length of the data pattern previous, in the PBW pattern, to the particular conversion target pattern. The PBW write data generator 604 converts the basic write data to the PBW write data by sequentially converting, based on the analysis result and the selected pattern conversion table, a plurality of the conversion target patterns out of the basic write data to the PBW patterns in accordance with the pattern lengths of the data patterns of a plurality of patterns previous, in the PBW pattern, to respective ones of the plurality of the conversion target patterns out of the basic write data. In other words, the PBW write data generator 604 converts the basic write data to the PBW write data by sequentially changing, based on the analysis result and the selected pattern conversion table, the position of the dummy inversion of the plurality of the PBW patterns obtained after conversion of the plurality of the conversion target patterns in accordance with the pattern lengths of the data patterns of a plurality of the patterns previous, in the PBW pattern, to the respective ones of the plurality of the conversion target patterns out of the basic write data. The PBW write data generator 604 outputs the PBW write data obtained by the conversion to the mask signal generator 605 and the PECL 606. In the process of converting the basic write data to the PBW write data, the PBW write data generator 604 may update (or may switch) the analysis result and the pattern conversion table so that they correspond to the basic write data obtained by the conversion of the particular conversion target pattern to the PBW pattern. The "data pattern previous to the conversion target pattern" may be hereinafter simply referred to as a "previous data pattern" or a "previous pattern".

Figure 4:
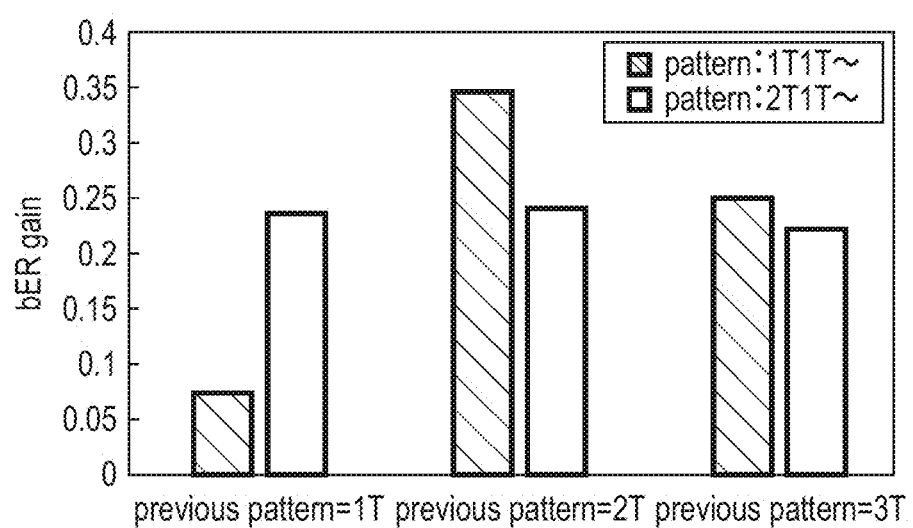
FIG. 4 is a diagram illustrating an example of an effect of a combination of a headmost pattern of a conversion target pattern and a previous data pattern on recording quality.

FIG. 4 is a diagram illustrating an example of effects of combinations of a headmost pattern of the conversion target pattern and the previous data pattern on recording quality. In FIG. 4, the vertical axis represents a gain of a bit error rate (BER) corresponding to an improvement amount of the recording quality corresponding to data written to the disk 10 applying the PBW method according to the present embodiment with respect to data written to the disk 10 without applying the PBW method (may be hereinafter simply referred to as a BER gain or a BER improvement amount), and the horizontal axis represents the pattern length of the previous data pattern. On the horizontal axis in FIG. 4, the pattern lengths 1T, 2T, and 3T of the previous data pattern are provided. The "previous data pattern having a pattern length of nT" or the "previous data pattern of a pattern length nT" may be hereinafter referred to as the "previous nT data pattern". A part of the data pattern of a pattern length mT that is transferred firstly in the data pattern of a pattern length nT and that is shorter than a pattern length nT may be hereinafter referred to as a head part, and a part of the data pattern of a pattern length 1T that is transferred lastly in the data pattern of a pattern length nT and that is shorter than a pattern length nT may be hereinafter referred to as an end part, and a part of the data pattern of a pattern length kT between the head part and the end part in the data pattern of a pattern length nT and that is shorter than a pattern length nT may be hereinafter referred to as a middle part. Here, l and k are positive integers. FIG. 4 illustrates the BER gain in the case where the data pattern of the top part of the conversion target pattern (may be hereinafter referred to as a head pattern) is converted to a sequence of [1T, 1T] data patterns (PBW pattern) (the BER gain may be hereinafter referred to as a BER gain corresponding to the [1T, 1T] head patterns), and the BER gain in the case where the head pattern of the conversion target pattern is converted to a sequence of [2T, 1T] data patterns (PBW patterns) (the BER gain may be hereinafter referred to as a BER gain corresponding to the [2T, 1T] head patterns). "A sequence of [nT, mT, . . . ] data patterns of the head part of the conversion target pattern" may be hereinafter referred to as an "[nT, mT, . . . ] head pattern" or an "nT+mT+ . . . head pattern". In FIG. 4, the BER gains corresponding to the [1T, 1T] head pattern are illustrated as hatched rectangles having right down oblique lines, and the BER gains corresponding to the [2T, 1T] head pattern are illustrated as unfilled rectangles. The [1T, 1T] head pattern corresponds to a data pattern including a data pattern that has a pattern length 1T and that is positioned at the headmost of the head pattern (may be hereinafter referred to as the headmost pattern), and a data pattern that has a pattern length 1T immediately after the headmost pattern (may be hereinafter referred to as a headmost adjacent pattern). The [2T, 1T] head pattern corresponds to a data pattern including a headmost pattern having a pattern length 2T and a headmost adjacent pattern having a pattern length 1T immediately after the headmost pattern.

In the example illustrated in FIG. 4, when the pattern length of the previous data pattern is 1T, the BER gain corresponding to the [2T, 1T] head pattern is larger than the BER gain corresponding to the [1T, 1T] head pattern. In other words, when the pattern length of the previous data pattern is 1T, the recording quality can be improved more by conversion of the head pattern of the conversion target pattern to the [2T, 1T] head pattern than by conversion to the [1T, 1T] head pattern. When the pattern length of the previous data pattern is 1T, a magnetization reversal is caused immediately after a pulse current is generated when the write processing using the head 15 to the disk 10 is performed based on a recording current generated in accordance with the PBW pattern obtained by conversion of the conversion target pattern, and thus a magnetic response in the head 15 is delayed. Therefore, when the pattern length of the previous data pattern is 1T, the recording quality can be improved more by conversion of the head pattern of the conversion target pattern to the [2T, 1T] head pattern than by conversion to the [1T, 1T] head pattern because the magnetic response of the head 15 can be accelerated. In other words, when the pattern length of the previous data pattern is 1T, the recording quality can be improved more by conversion of the data pattern positioned in the headmost part of the conversion target pattern (may be hereinafter referred to as a headmost pattern) to the 2T data pattern than by conversion to the 1T data pattern because the magnetic response of the head 15 can be accelerated. The headmost pattern corresponds to the headmost part of the head pattern of the particular data pattern.

In the example illustrated in FIG. 4, when the pattern length of the previous data pattern is 2T, the BER gain corresponding to the [1T, 1T] head pattern is larger than the BER gain corresponding to the [2T, 1T] head pattern. In other words, when the pattern length of the previous data pattern is 2T, the recording quality can be improved more by conversion of the head pattern of the conversion target pattern to the [1T, 1T] head pattern than by conversion to the [2T, 1T] head pattern. When the pattern length of the previous data pattern is 2T, the pulse current is temporarily reset to zero and then a magnetization state in the head 15 is reset when the write processing using the head 15 to the disk 10 is performed based on a recording current generated in accordance with the PBW pattern obtained by converting the conversion target pattern. Therefore, when the pattern length of the previous data pattern is 2T, the first polarity inversion does not require a large current when the write processing using the head 15 to the disk 10 is performed based on the recording current generated in accordance with the PBW pattern obtained by converting the conversion target pattern. Thus, by converting the head part of the conversion target pattern to the [1T, 1T] head pattern and driving the motor with a minimum current, an effect on non linear transition shift (NLTS), adjacent erasure, and the like can be reduced. In other words, when the pattern length of the previous data pattern is 2T, the first polarity inversion does not require a large current when the write processing using the head 15 to the disk 10 is performed based on the recording current generated in accordance with the PBW pattern obtained by converting the conversion target pattern. Thus, by converting the headmost pattern of the conversion target pattern to the 1T data pattern and driving the motor with a minimum current, the effect on NLTS, adjacent erasure, and the like can be reduced.

In the example illustrated in FIG. 4, when a data length of the previous data pattern is 3T, the BER gain corresponding to the [1T, 1T] head pattern is larger than the BER gain corresponding to the [2T, 1T] head pattern. In other words, when the data length of the previous data pattern is 3T, the recording quality can be improved more if the head pattern of the conversion target pattern is converted to the [1T, 1T] head pattern than that by conversion to the [2T, 1T] head pattern. When the data length of the previous data pattern is 3T, the magnetization state in the head 15 is reset because the pulse current is temporarily reset to zero when the write processing using the head 15 is performed to the disk 10 based on the recording current generated in accordance with the PBW pattern obtained by converting the conversion target pattern. Thus, when the pattern length of the previous data pattern is 3T, the effect on NLTS, adjacent erasure, and the like can be reduced by converting the head part of the conversion target pattern to the [1T, 1T] head pattern and driving the motor with a minimum current because the first polarity inversion does not require a large current when the write processing using the head 15 is performed to the disk 10 based on the recording current generated in accordance with the PBW pattern obtained by converting the conversion target pattern. In other words, when the pattern length of the previous data pattern is 2T, the first polarity inversion does not require a large current when the write processing using the head 15 to the disk 10 is performed based on the recording current generated in accordance with the PBW pattern obtained by converting the conversion target pattern. Thus, by converting the headmost pattern of the conversion target pattern to the 1T data pattern and driving the motor with a minimum current, the effect on NLTS, adjacent erasure, and the like can be reduced.

For example, when the pattern length of the previous data pattern is 1T, the PBW write data generator 604 converts the head pattern of the conversion target pattern to the [2T, 1T]

head pattern. When the pattern length of the previous data pattern is 2T and 3T, the PBW write data generator 604 converts the head pattern of the conversion target pattern to the [1T, 1T] head pattern.

For example, when the pattern length of the previous data pattern is 1T, the PBW write data generator 604 converts the headmost pattern of the conversion target pattern to the 2T data pattern. When the pattern length of the previous data pattern is 2T and 3T, the PBW write data generator 604 converts the headmost pattern of the conversion target pattern to the 1T data pattern.

FIG. 5 is a diagram illustrating an example of an effect of a combination of the headmost adjacent pattern of the conversion target pattern and the previous data pattern on the recording quality. In FIG. 5, the vertical axis represents the BER gain, and the horizontal axis represents the pattern length of the previous data pattern. The horizontal axis in FIG. 5 represents the pattern lengths 1T, 2T, and 3T of the previous data pattern. FIG. 5 illustrates the BER gain in the case where the head pattern of the conversion target pattern is converted to a sequence of the [2T, 1T] head pattern (PBW pattern) (the BER gain may be hereinafter referred to as a BER gain corresponding to the [2T, 1T] head pattern), and the BER gain in the case where the head pattern of the conversion target pattern is converted to a sequence of the [2T, 2T] head pattern (PBW pattern) (the BER gain may be hereinafter referred to as a BER gain corresponding to the [2T, 2T] head pattern). In FIG. 5, the BER gains corresponding to the [2T, 1T] head pattern are illustrated as hatched rectangles having right down oblique lines, and the BER gains corresponding to the [2T, 2T] head pattern are illustrated as unfilled rectangles. The [2T, 1T] head pattern corresponds to the data pattern including the headmost adjacent pattern having a pattern length 1T corresponding to a section having zero currents immediately after the headmost pattern having a pattern length 2T in the pulse state. For example, the write data including the [2T, 1T] head pattern corresponds to a data sequence [11011000] and the like. The [2T, 2T] head pattern corresponds to the data pattern including the headmost adjacent pattern having a pattern length 2T corresponding to the section having zero currents immediately after the headmost pattern having a pattern length 2T in the pulse state. For example, the write data including the [2T, 2T] head pattern corresponds to a data sequence [11001100] and the like.

In the example illustrated in FIG. 5, when the pattern length of the previous data pattern is 1T, 2T, and 3T, the BER gain corresponding to the [2T, 2T] head pattern is larger than the BER gain corresponding to the [2T, 1T] head pattern. In other words, when the pattern length of the previous data pattern is 1T, 2T, and 3T, the recording quality can be improved more if the head pattern of the conversion target pattern is converted to the [2T, 1T] head pattern, than by conversion to the [2T, 2T] head pattern. The example illustrated in FIG. 5 illustrates that the recording quality can be degraded by the headmost adjacent pattern having a pattern length 2T regardless of the previous data pattern. Therefore, the recording quality can be improved by repeating one set of the data pattern, using the [2T, 1T] data pattern as the one set.

For example, the PBW write data generator 604 converts the data pattern next to or following the head pattern of the conversion target pattern (or the data pattern in the middle part of the conversion target pattern) (the data pattern may be hereinafter referred to as a middle pattern) to the data pattern repeating the [2T, 1T] data pattern. The data pattern next to the head pattern of the particular write data may be hereinafter referred to as the middle pattern.

FIG. 6 is a diagram illustrating an example of an effect of a combination of an end pattern of the conversion target pattern and the previous data pattern on the recording quality. In FIG. 6, the vertical axis represents the BER gain, and the horizontal axis represents the pattern length of the previous data pattern. The horizontal axis in FIG. 6 represents the pattern lengths 1T, 2T, and 3T of the previous data pattern. FIG. 6 illustrates the BER gain in the case where the data pattern of the end part of the conversion target pattern (may be hereinafter referred to as the end pattern) is converted to a 3T data pattern (the BER gain may be hereinafter referred to as a BER gain corresponding to the 3T end pattern), and the BER gain in the case where the end pattern of the conversion target pattern is converted to a 4T data pattern (PBW pattern) (the BER gain may be hereinafter referred to as a BER gain corresponding to a 4T end pattern). The "nT data pattern of the end part of the conversion target pattern" may be hereinafter referred to as an "nT end pattern". In FIG. 6, the BER gains corresponding to the 3T end pattern is illustrated as hatched rectangles having right down oblique lines, and the BER gain corresponding to the 4T end pattern is illustrated as unfilled rectangles. The "data pattern following the middle pattern of the conversion target pattern" may be hereinafter referred to as the "end pattern". The middle pattern is positioned between the head pattern and the end pattern.

In the example illustrated in FIG. 6, when the pattern length of the previous data pattern is 1T, 2T, and 3T, the BER gain corresponding to the 3T end pattern is larger than the BER gain corresponding to the 4T end pattern. In other words, when the pattern length of the previous data pattern is 1T, 2T, and 3T, the recording quality can be improved more if the end pattern of the conversion target pattern is converted to the 3T data pattern, than by conversion to the 4T data pattern. The example illustrated in FIG. 6 illustrates that the recording quality can be degraded by the end pattern having a pattern length 4T regardless of the previous data pattern. Therefore, the pattern length of the end pattern of the conversion target pattern is preferably set to 1T, 2T, or 3T.

For example, the PBW write data generator 604 converts the end pattern of the conversion target pattern to the 1T, 2T, or 3T data pattern.

FIG. 7 is a schematic diagram illustrating an example of a pattern conversion table TB1 according to the present embodiment. The pattern conversion table TB1 in FIG. 7 includes the conversion target pattern, a PBW pattern set to which the conversion target pattern is converted when a previous data pattern has a pattern length of 1T (may be hereinafter referred to as a PBW pattern set 1), and a PBW pattern set to which the conversion target pattern is converted when a previous data pattern has a pattern length is 2T and 3T (may be hereinafter referred to as a PBW pattern set 2). The pattern conversion table TB1 in FIG. 7 includes conversion target patterns having pattern lengths of 1T, 2T, 3T, 4T, 5T, 6T, 7T, 8T, 9T, 10T, 11T, 12T, 13T, 14T, 15T, and 16T. The PBW pattern set 1 includes a PBW pattern and a non-return to zero (NRZ). The PBW pattern set 2 includes a PBW pattern and a NRZ. The pattern conversion table TB1 is held by the table management unit 603 illustrated in FIG. 3. The pattern conversion table TB1 may be separated into a table of the PBW pattern set 1 and a table of the PBW pattern set 2 and provided separately.

In the example illustrated in FIG. 7, when the pattern length of the previous data pattern is 1T, the PBW write data generator 604 converts the head pattern and the middle pattern(s) of the conversion target pattern having a pattern length of 4T or longer to a data pattern repeatedly having a [2T, 1T] data pattern based on the pattern conversion table TB1. When the pattern length of the previous data pattern is 1T, the PBW write data generator 604 converts the head pattern and the middle pattern(s) of the conversion target pattern having a pattern length of 4T or longer to a data pattern repeatedly having a [2T, 1T] data pattern, and converts the end pattern of the conversion target pattern to a 1T, 2T, or 3T data pattern based on the pattern conversion table TB1.

In the example illustrated in FIG. 7, when the pattern length of the previous data pattern is 2T and 3T, the PBW write data generator 604 converts the head pattern of the conversion target pattern having a pattern length of 4T or longer to the data pattern formed by converting the headmost pattern of the PBW pattern of the PBW pattern set 1 to the 1T data pattern and converts the end pattern of the conversion target pattern to the 1T, 2T, or 3T data pattern based on the pattern conversion table TB1. When the pattern length of the previous data pattern is 2T and 3T, the PBW write data generator 604 converts the head pattern of the conversion target pattern having a pattern length 4T or longer to a [1T, 1T] data pattern, converts the middle pattern of the conversion target pattern to a data pattern repeatedly having a [2T, 1T] data pattern, and converts the end pattern of the conversion target pattern to the 1T, 2T, or 3T data pattern based on the pattern conversion table TB1.

FIG. 8 is a schematic diagram illustrating an example of a pattern conversion table TB2 according to the present embodiment. The pattern conversion table TB2 in FIG. 8 includes a conversion target pattern, a PBW pattern set 1, and a PBW pattern set 2. The pattern conversion table TB2 in FIG. 8 includes conversion target patterns having pattern lengths of 1T, 2T, 3T, 4T, 5T, 6T, 7T, 8T, 9T, 10T, 11T, 12T, 13T, 14T, 15T, and 16T. The PBW pattern set 1 includes a PBW pattern and a NRZ. The PBW pattern set 2 includes a PBW pattern and a NRZ. The pattern conversion table TB2 is held by the table management unit 603 illustrated in FIG. 3. The pattern conversion table TB2 may be separated into the table of the PBW pattern set 1 and the table of the PBW pattern set 2 and provided separately.

In the example illustrated in FIG. 8, when the pattern length of the previous data pattern is 1T, the PBW write data generator 604 converts the head pattern and the middle pattern(s) of the conversion target pattern having a pattern length of 4T or longer to a data pattern repeatedly having a [2T, 1T] data pattern based on the pattern conversion table TB2. When the pattern length of the previous data pattern is 1T, the PBW write data generator 604 converts the head pattern and the middle pattern(s) of the conversion target pattern having a pattern length of 4T or longer to a data pattern repeatedly having a [2T, 1T] data pattern, and converts the end pattern of the conversion target pattern to a 1T, 2T, or 3T data pattern based on the pattern conversion table TB2.

In the example illustrated in FIG. 8, when the pattern length of the previous data pattern is 2T and 3T, the PBW write data generator 604 converts the head pattern of the conversion target pattern having a pattern length of 4T or longer to the [1T, 1T] data pattern or the [2T, 1T] data pattern, and converts the end pattern of the conversion target pattern to the data pattern that is not a 1T data pattern, such as a 2T, or 3T data pattern based on the pattern conversion table TB2.

The mask signal generator 605 generates a mask signal to mask a dummy inversion. In other words, the mask signal generator 605 generates a mask signal indicating a dummy inversion. The mask signal generator 605 generates a mask signal based on the PBW write data input from the PBW write data generator 604. The mask signal generator 605 is connected to the PBW write data generator 604 and the mask signal controller 301. The mask signal generator 605 outputs the generated mask signal to the mask signal controller 301.

The PECL 606 generates a voltage (or a current) corresponding to the write data. In other words, the PECL 606 generates a voltage (or a current) waveform corresponding to the write data. For example, the PECL 606 generates the voltage (or the current) corresponding to the PBW write data input from the PBW write data generator 604. In other words, the PECL 606 generates the voltage (or the current) waveform corresponding to the PBW write data input from the PBW write data generator 604. The PECL 606 is connected to the PBW write data generator 604 and the write driver 302. The PECL 606 outputs the voltage (or the current) corresponding to the generated PBW write data to the write driver 302. In other words, the PECL 606 outputs the voltage (or the current) waveform corresponding to the generated PBW write data to the write driver 302.

The mask signal controller 301 controls the mask signal. The mask signal controller 301 controls the mask signal input from the mask signal generator 605. The mask signal controller 301 is connected to the mask signal generator 605 and the write driver 302. The mask signal controller 301 outputs the controlled mask signal to the write driver 302.

The write driver 302 generates the recording current. The write driver 302 generates the recording current based on the voltage (or the current) corresponding to the PBW write data input from the PECL 606 and the mask signal input from the mask signal controller 301. The write driver 302 generates the recording current without causing polarity inversion of the dummy inversion in the voltage (or the current) corresponding to the PBW write data according to the mask signal. In other words, the write driver 302 generates the recording current having the dummy inversion in the voltage (or the current) corresponding to the PBW write data masked according to the mask signal. The write driver 302 is connected to the PECL 606 and the mask signal controller 301. The write driver 302 outputs the recording current to the head 15 (write head 15W).

FIG. 9A is a schematic diagram illustrating an example of a method of converting the write data according to the present embodiment. In FIG. 9A, the horizontal axis represents time t. In the horizontal axis in FIG. 9A, the point side of the arrow of the time t may be referred to as the rear side or the right side, and the opposite side of the point of the arrow of the time t may be referred to as the front side or the left side. FIG. 9A illustrates the basic write data, the PBW write data, the mask signal, and the recording current. The basic write data and the PBW write data rises to be high (H), and falls to be low (L). The mask signal rises at positions of dummy inversions, and is low at positions other than the positions of the dummy inversions. The recording current rises to the positive (+) side, and falls to the negative (−) side.

In the example illustrated in FIG. 9A, the write system WSY converts a conversion target pattern that is 4T or longer out of the basic write data to a PBW pattern based on the pattern conversion table TB1. For example, on the front side of the basic write data, the write system WSY converts the 4T data pattern following a data pattern having a pattern length of 2T to a [1T, 1T, 2T] PBW pattern based on the pattern conversion table TB1. On the front side of the basic write data, the write system WSY converts the 5T data pattern following a data pattern having a pattern length of 1T to a [2T, 1T, 2T] PBW pattern based on the pattern conversion table TB1. On the rear side of the basic write data, the write system WSY converts the 4T data pattern following a data pattern having a pattern length of 1T to a [2T, 1T, 1T] PBW pattern based on the pattern conversion table TB1. On the rear side of the basic write data, the write system WSY converts the 4T data pattern following a data pattern having a pattern length of 2T to a [1T, 1T, 2T] PBW pattern based on the pattern conversion table TB1.

In the example illustrated in FIG. 9A, the write system WSY converts the conversion target patterns having data lengths of 4T or longer out of the basic write data to the PBW patterns based on the pattern conversion table TB1 as described above to convert the basic write data to the PBW write data.

In the example illustrated in FIG. 9A, the write system WSY generates the recording current based on the PBW write data and the mask signal. The write system WSY generates the recording current from the PBW write data such that the recording current does not have polarity inversion at the positions of the dummy inversions based on the mask signal.

Figure 9B:
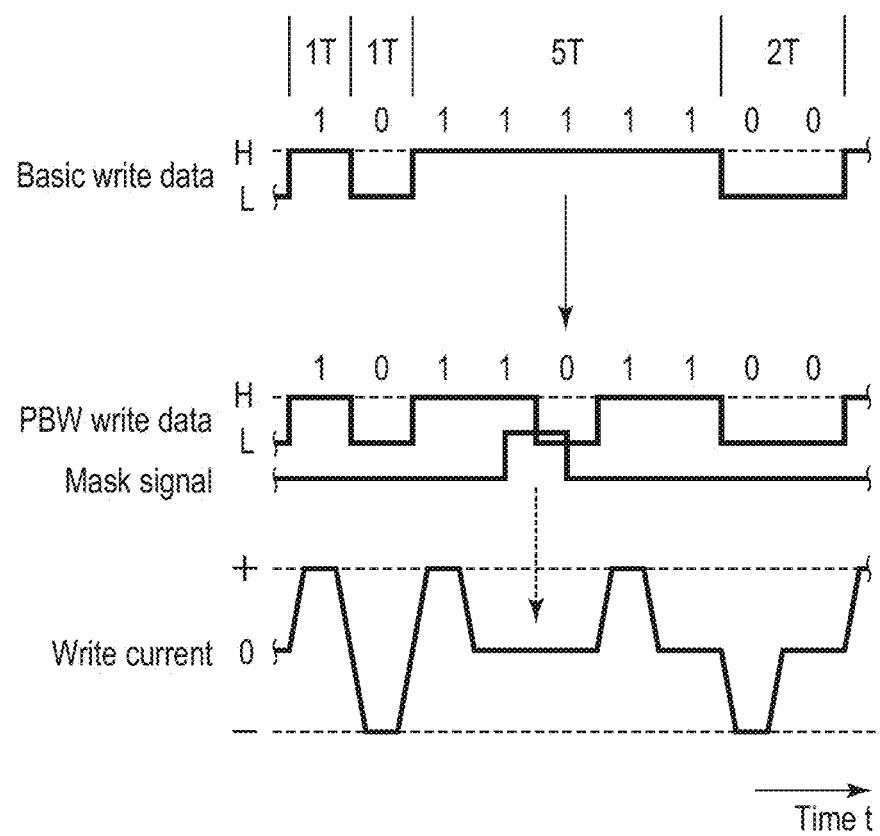
FIG. 9B is an enlarged view of a part of basic write data illustrated in FIG. 9A, a part of PBW write data, a part of a mask signal, and a part of a recording current.

FIG. 9B is an enlarged view of a part of the basic write data, a part of the PBW write data, a part of the mask signal, and a part of the recording current that are illustrated in FIG. 9A. FIG. 9B corresponds to FIG. 9A. The method of converting the write data will be described using FIG. 9B.

In the example illustrated in FIG. 9B, the basic write data includes 1T, 1T, 5T, and 2T data patterns. The write system WSY converts the 5T data pattern to the [2T, 1T, 2T] PBW patterns based on the pattern conversion table TB1 in accordance with the 5T data pattern of the same polarity illustrated in FIG. 9B because the pattern length of the previous data pattern of the 5T data pattern is 1T.

In the example illustrated in FIG. 9B, the write system WSY generates the recording current from the write data of the [2T, 1T, 2T] PBW patterns such that the recording current does not have polarity inversion at the 1T data pattern that is between the 2T data pattern and the 2T data pattern and corresponds to the position of the dummy inversion of the [2T, 1T, 2T] PBW pattern based on the write data of the [2T, 1T, 2T] PBW pattern and the mask signal.

Figure 10:
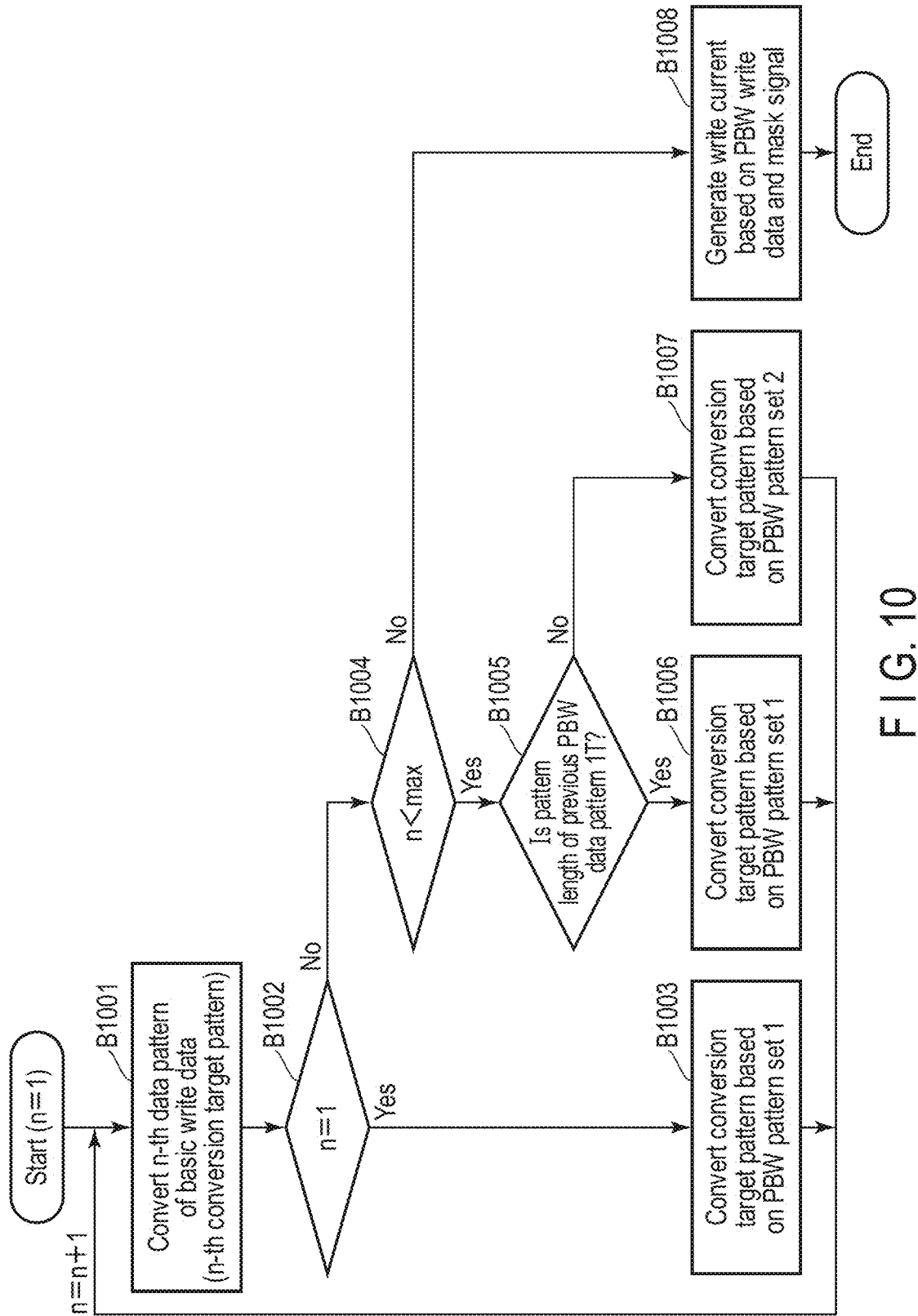
FIG. 10 is a flowchart illustrating an example of a method of generating the write data according to the embodiment.

FIG. 10 is a flowchart illustrating an example of a method of generating write data according to the present embodiment.

The magnetic disk device 1 converts the n-th data pattern (n-th conversion target pattern) of the basic write data (B1001), and determines whether n is 1 or n is not 1 (B1002). If the magnetic disk device 1 determines that n is 1 (B1002: YES), the magnetic disk device 1 converts the conversion target pattern based on the PBW pattern set 1 (B1003), and proceeds to the processing of B1001 with n incremented by 1. If the magnetic disk device 1 determines that n is not 1 (B1002: NO), the magnetic disk device 1 determines whether n is less than a maximum or n is the maximum (B1004).

If the magnetic disk device 1 determines that n is less than the maximum (B1004: YES), the magnetic disk device 1 determines whether the pattern length of the previous PBW data pattern is 1T (B1005). If the magnetic disk device 1 determines that the pattern length of the previous PBW data pattern is 1T (B1005: YES), the magnetic disk device 1 converts the conversion target pattern based on the PBW pattern set 1 (B1006), and proceeds to the processing of B1001 with n incremented by 1. If the magnetic disk device 1 determines that the pattern length of the previous PBW data pattern is not 1T (B1005: NO), the magnetic disk device 1 converts the conversion target pattern based on the PBW pattern set 2 (B1007), and proceeds to the processing of B1001 with n incremented by 1.

If the magnetic disk device 1 determines that n is the maximum (B1004: NO), the magnetic disk device 1 generates a write current based on the PBW write data and the mask signal (B1008), and ends the processing.

According to the present embodiment, the magnetic disk device 1 converts the head pattern of each of conversion target patterns corresponding to data patterns that are 4T or longer following a previous data pattern having a pattern length of 1T to the [2T, 1T] data pattern, and converts the middle pattern(s) of the conversion target pattern to the data pattern repeatedly having the [2T, 1T] data pattern, and converts the end pattern of the conversion target pattern to the 1T, 2T, or 3T data pattern, based on the pattern conversion table TB1. The magnetic disk device 1 converts the head pattern of each of conversion target patterns corresponding to the data patterns that are 4T or longer following a previous data pattern having pattern length of 2T or 3T to the [1T, 1T] data pattern, and converts the middle pattern(s) of the conversion target pattern to the data pattern repeatedly having the [2T, 1T] data pattern, and converts the end pattern of the conversion target pattern to the 1T, 2T, or 3T data pattern, based on the pattern conversion table TB1. The magnetic disk device 1 converts the head pattern of each of conversion target patterns corresponding to the data patterns that are 4T or longer following a previous data pattern having a pattern length of 1T to the [2T, 1T] data patterns, and converts the middle pattern(s) of the conversion target pattern to the data pattern repeating having the [2T, 1T] data patterns, and converts the end pattern of the conversion target pattern to the 1T, 2T, or 3T data pattern, based on the pattern conversion table TB2. The magnetic disk device 1 converts the head pattern of each of conversion target patterns corresponding to the data patterns that are 4T or longer following a previous data pattern having a pattern length of 2T or 3T to the [1T, 1T] data pattern or to the [2T, 1T] data pattern, and converts the middle pattern(s) of the conversion target pattern to the data pattern repeating the [2T, 1T] data pattern, and converts the end pattern of the conversion target pattern to the 2T or 3T data pattern, based on the pattern conversion table TB2. The magnetic disk device 1 converts the basic write data to the PBW write data based on the pattern conversion table in accordance with the previous data pattern. Therefore, the magnetic disk device 1 can increase the BER improvement effect by the write processing in the PBW method. Accordingly, the magnetic disk device 1 can increase reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
a disk;

a head to write data to the disk and read data from the disk;

a preamplifier to generate a recording current corresponding to write data that the head writes to the disk; and a controller to convert a first data pattern in the write data, in accordance with a pattern length of a second data pattern previous to the first data pattern, to a different data pattern including a pseudo polarity inversion processed that the recording current does not cause a polarity inversion when converting the first data pattern to the recording current.

2. The magnetic disk device according to claim 1, wherein the controller converts the first data pattern to a third data pattern including a head part including a sequence of data patterns of 2T+1T when a pattern length of a PBW pattern obtained by converting the second data pattern is 1T.

3. The magnetic disk device according to claim 2, wherein the controller converts the first data pattern to the third data pattern including a middle part that follows the head part and that is formed by repeating a sequence of data patterns of 2T+1T.

4. The magnetic disk device according to claim 3, wherein the controller converts the first data pattern to the third data pattern including an end part that follows the middle part and that includes a data pattern of 1T, 2T, or 3T.

5. The magnetic disk device according to claim 1, wherein the controller converts the first data pattern to a fourth data pattern including a head part including a sequence of data patterns of 1T+1T when a pattern length of a PBW pattern obtained by converting the second data pattern is not 1T.

6. The magnetic disk device according to claim 5, wherein the controller converts the first data pattern to the fourth data pattern including a middle part that follows the head part and that is formed by repeating a sequence of data patterns of 2T+1T.

7. The magnetic disk device according to claim 6, wherein the controller converts the first data pattern to the fourth data pattern including an end part that follows the middle part and that includes a data pattern of 1T, 2T, or 3T.

8. The magnetic disk device according to claim 1, wherein the controller includes a table used for converting the first data pattern to the different data pattern including the pseudo polarity inversion that does not cause a polarity inversion when converting the first data pattern to the recording current in accordance with a pattern length of the second data pattern.

9. A magnetic disk device, comprising:
a disk;
a head to write data to the disk and read the data from the disk;
a preamplifier to generate a recording current corresponding to write data that the head writes to the disk; and
a controller to convert a first data pattern in the write data to a plurality of data patterns that have, at different positions, pseudo polarity inversions processed that the recording current do not cause a polarity inversion when converting the first data pattern to the recording current.

10. The magnetic disk device according to claim 9, wherein the controller converts the first data pattern to one data pattern out of the plurality of data patterns in accordance with a pattern length of a second data pattern previous to the first data pattern.

11. The magnetic disk device according to claim 10, wherein the controller converts the first data pattern to a third data pattern including a head part including a sequence of data patterns of 2T+1T when a pattern length of a PBW pattern obtained by converting the second data pattern is 1T.

12. The magnetic disk device according to claim 11, wherein the controller converts the first data pattern to the third data pattern including a middle part that follows the head part and that is formed by repeating a sequence of data patterns of 2T+1T.

13. The magnetic disk device according to claim 12, wherein the controller converts the first data pattern to the third data pattern including an end part that follows the middle part and that includes a data pattern of 1T, 2T, or 3T.

14. The magnetic disk device according to claim 10, wherein the controller converts the first data pattern to a fourth data pattern including a head part including a sequence of data patterns of 1T+1T when a pattern length of a PBW pattern obtained by converting the second data pattern is not 1T.

15. The magnetic disk device according to claim 14, wherein the controller converts the first data pattern to the fourth data pattern including a middle part that follows the head part and that is formed by repeating a sequence of data patterns of 2T+1T.

16. The magnetic disk device according to claim 15, wherein the controller converts the first data pattern to the fourth data pattern including an end part that follows the middle part and that includes a data pattern of 1T, 2T, or 3T.

17. A method of generating write data applied to a magnetic disk device including a disk, a head to write data to the disk and read the data from the disk, and a preamplifier to generate a recording current corresponding to write data that the head writes to the disk, the method comprising
converting a first data pattern in the write data to a plurality of different data patterns that have, at different positions, pseudo polarity inversions processed that the recording current does not cause a polarity inversion when converting the first data pattern to the recording current.

18. The method of generating write data according to claim 17 further comprising converting the first data pattern to one data pattern out of the plurality of data patterns in accordance with a pattern length of a second data pattern previous to the first data pattern.

19. The method of generating write data according to claim 18 further comprising converting the first data pattern to a third data pattern including a head part including a sequence of data patterns of 2T+1T when a pattern length of a PBW pattern obtained by converting the second data pattern is 1T.

20. The method of generating write data according to claim 19 further comprising converting the first data pattern to the third data pattern including a middle part that follows the head part and that is formed by repeating a sequence of data patterns of 2T+1T.

* * * * *